US009121425B2

(12) United States Patent
Wanek et al.

(10) Patent No.: US 9,121,425 B2
(45) Date of Patent: *Sep. 1, 2015

(54) CONNECTION SYSTEM FOR CRANE COMPONENTS

(71) Applicants: Michael J. Wanek, Two Rivers, WI (US); Robert J. Walker, Manitowoc, WI (US); Nathan P. Holly, New Franken, WI (US)

(72) Inventors: Michael J. Wanek, Two Rivers, WI (US); Robert J. Walker, Manitowoc, WI (US); Nathan P. Holly, New Franken, WI (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/846,498

(22) Filed: Mar. 18, 2013

(65) Prior Publication Data
US 2013/0223926 A1  Aug. 29, 2013

Related U.S. Application Data

(60) Continuation of application No. 12/561,094, filed on Sep. 16, 2009, now Pat. No. 8,397,924, and a continuation-in-part of application No. 13/154,236, filed on Jun. 6, 2011, now Pat. No. 8,534,474, which is
(Continued)

(51) Int. Cl.
*B66C 23/26* (2006.01)
*F16B 7/10* (2006.01)
(Continued)

(52) U.S. Cl.
CPC ............ *F16B 7/105* (2013.01); *B66C 23/36* (2013.01); *B66C 23/82* (2013.01); *B66D 1/28* (2013.01); *Y10T 29/49826* (2015.01); *Y10T 403/7079* (2015.01)

(58) Field of Classification Search
USPC ............... 212/175, 176, 177, 299, 300, 347; 403/157, 161, 287, 353
See application file for complete search history.

(56) References Cited

U.S. PATENT DOCUMENTS

| 2,529,454 A | 11/1950 | Marcantonio |
| 2,975,910 A | 3/1961 | Conrad |

(Continued)

FOREIGN PATENT DOCUMENTS

| DE | 3706301 C1 | 10/1987 |
| DE | 4402005 A1 | 7/1995 |

(Continued)

OTHER PUBLICATIONS

Brochure, "HC-238, 125-Ton Truck Crane" 3 pages (undated but prior to Nov. 29, 2007).
(Continued)

*Primary Examiner* — Emmanuel M Marcelo
(74) *Attorney, Agent, or Firm* — Craig Buschmann; Brinks Gilson & Lione

(57) ABSTRACT

A mobile lift crane includes a carbody having movable ground engaging members; a rotating bed rotatably connected to the carbody; a boom pivotally mounted on the rotating bed; a first hoist drum mounted in a first frame connected to the rotating bed; a second hoist drum mounted in a second frame connected to the rotating bed. Connectors used to connect the load hoist drum frames to the rotating bed include engagement members and alignment surfaces such that as the two crane components are brought close to their operational position during an assembly operation, the engagement member and the alignment surface of the connectors come into contact with one another to guide the crane components into their operational orientation so that a main pin can be placed through the through-holes of the extensions of the connectors.

20 Claims, 7 Drawing Sheets

Related U.S. Application Data a division of application No. 12/273,310, filed on Nov. 18, 2008, now Pat. No. 7,954,657.

(60) Provisional application No. 61/098,632, filed on Sep. 19, 2008, provisional application No. 61/155,401, filed on Feb. 25, 2009, provisional application No. 60/990,977, filed on Nov. 29, 2007.

(51) Int. Cl.
  *B66C 23/36* (2006.01)
  *B66C 23/82* (2006.01)
  *B66D 1/28* (2006.01)

(56) References Cited

U.S. PATENT DOCUMENTS

| | | | |
|---|---|---|---|
| 3,085,695 A | 4/1963 | Miller |
| 3,430,778 A | 3/1969 | Brown |
| 3,955,684 A | 5/1976 | Novotny |
| 3,977,530 A | 8/1976 | Helm et al. |
| 4,081,081 A | 3/1978 | Morrow et al. |
| 4,273,244 A | 6/1981 | Jensen et al. |
| 4,582,205 A | 4/1986 | Berger et al. |
| 5,082,128 A | 1/1992 | Franzen et al. |
| 5,199,586 A | 4/1993 | Pech et al. |
| 5,443,169 A | 8/1995 | Pagel et al. |
| 5,484,069 A | 1/1996 | Lanning |
| 6,062,405 A | 5/2000 | Pech et al. |
| 6,089,388 A | 7/2000 | Willim |
| 6,131,751 A | 10/2000 | Pech et al. |
| 6,213,318 B1 | 4/2001 | Walker |
| 6,481,202 B1 | 11/2002 | Zuehlke et al. |
| 6,588,521 B1 | 7/2003 | Porubcansky et al. |
| 6,702,132 B1 | 3/2004 | Moore et al. |
| 7,007,764 B2 | 3/2006 | Smith et al. |
| 7,270,243 B2 | 9/2007 | Diehl |
| 7,503,623 B2 | 3/2009 | Favaretto |
| 7,546,928 B2 | 6/2009 | Pech et al. |
| 7,565,982 B2 | 7/2009 | Kurotsu et al. |
| 7,762,412 B2 | 7/2010 | Porubcansky |
| 7,954,657 B2 | 6/2011 | Holly et al. |
| 7,967,158 B2 | 6/2011 | Pech et al. |
| 8,534,474 B2 | 9/2013 | Holly et al. |
| 8,622,228 B2 | 1/2014 | Mentink et al. |
| 8,739,988 B2 | 6/2014 | Walker |
| 2002/0053551 A1 | 5/2002 | Koster et al. |
| 2006/0065616 A1 | 3/2006 | Diehl |
| 2007/0256999 A1 | 11/2007 | Kurotsu et al. |
| 2008/0099421 A1 | 5/2008 | Pech et al. |
| 2008/0173605 A1 | 7/2008 | Willim |
| 2008/0203045 A1 | 8/2008 | Pech et al. |
| 2008/0264887 A1 | 10/2008 | Porubcansky |
| 2010/0260539 A1 | 10/2010 | Sakamoto et al. |
| 2010/0326004 A1 | 12/2010 | Daas et al. |
| 2011/0233165 A1 | 9/2011 | Holly et al. |
| 2011/0284490 A1 | 11/2011 | Liu et al. |
| 2012/0067840 A1 | 3/2012 | Walker |
| 2012/0175333 A1 | 7/2012 | Pech et al. |
| 2013/0270208 A1 | 10/2013 | Walker et al. |

FOREIGN PATENT DOCUMENTS

| | | |
|---|---|---|
| EP | 0376417 A1 | 7/1990 |
| EP | 0533323 A1 | 3/1993 |
| EP | 1205421 A1 | 5/2002 |
| EP | 1468955 A1 | 10/2004 |
| EP | 2431322 A1 | 3/2012 |
| JP | 1988-212692 A | 5/1988 |
| JP | 1990-225294 A | 7/1990 |
| JP | 09156882 A | 6/1997 |
| JP | 2004-189496 A | 8/2004 |
| NL | 1035078 C1 | 3/2008 |
| RU | 1801180 A3 | 3/1993 |

OTHER PUBLICATIONS

Brochure for Manitowoc 4100 Crane, 1 page (undated but prior to Sep. 16, 2009).
Liebherr LR11350—four photographs of load, boom and mast hoist drum mounting (undated but prior to Sep. 16, 2009).
Manitowoc 16000—three photographs of load and mast hoist drums (undated but prior to Sep. 16, 2009).
Pages from "LR1600/2 Crawler Crane—Technical Data," Liebherr, pp. 1-10 (undated but prior to Sep. 16, 2009).
U.S. Appl. No. 12/561,007, filed Sep. 16, 2009.

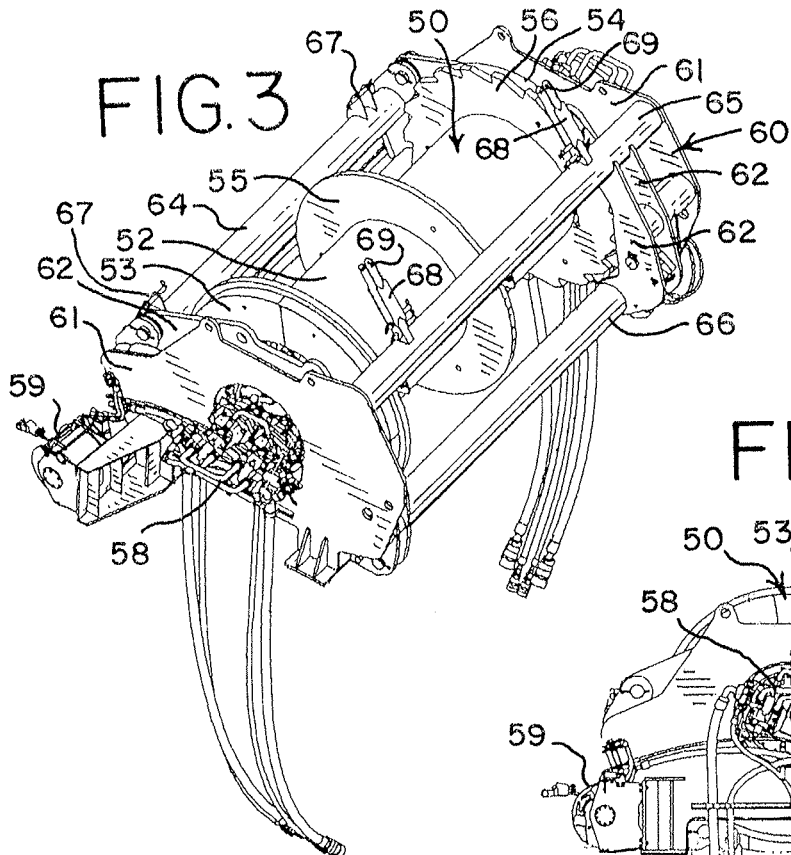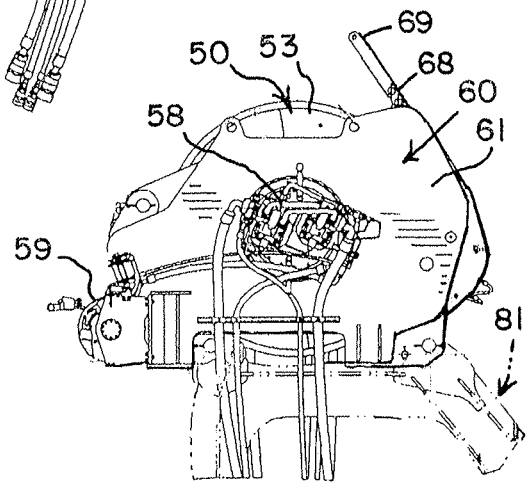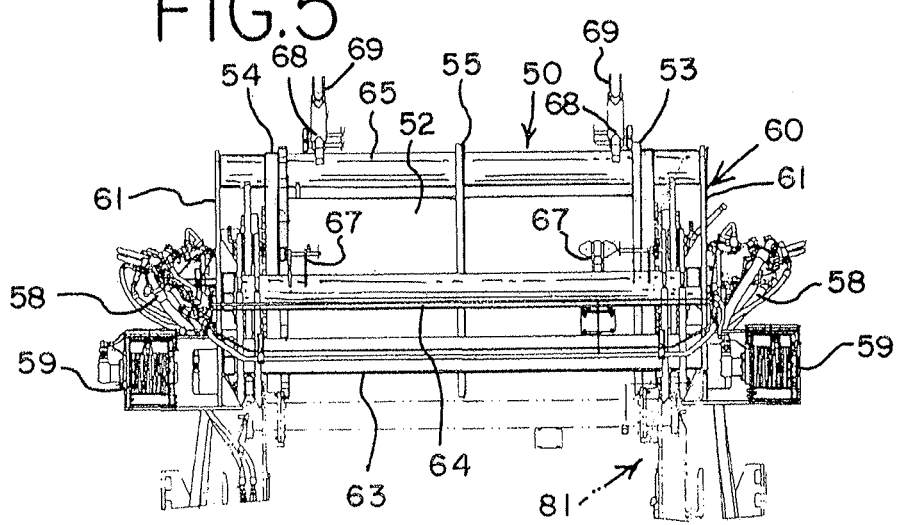

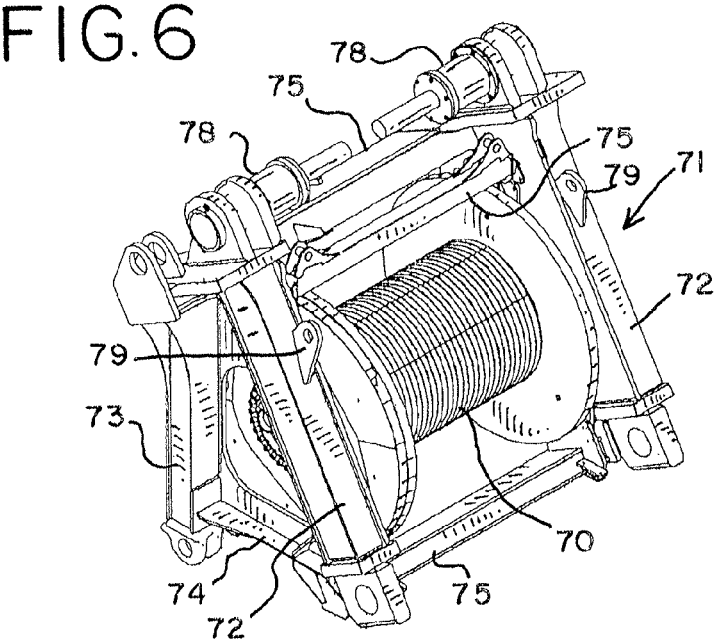
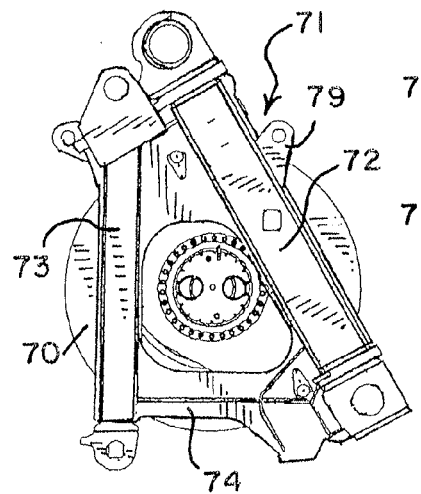
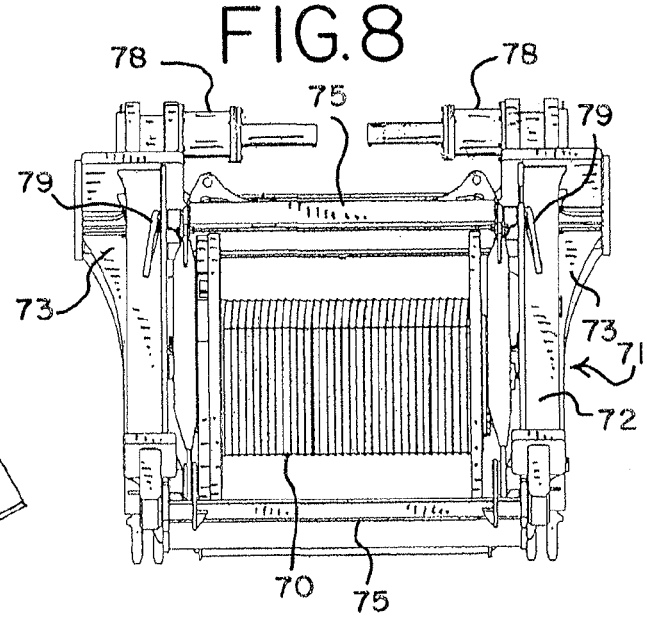
FIG.6
FIG.7
FIG.8

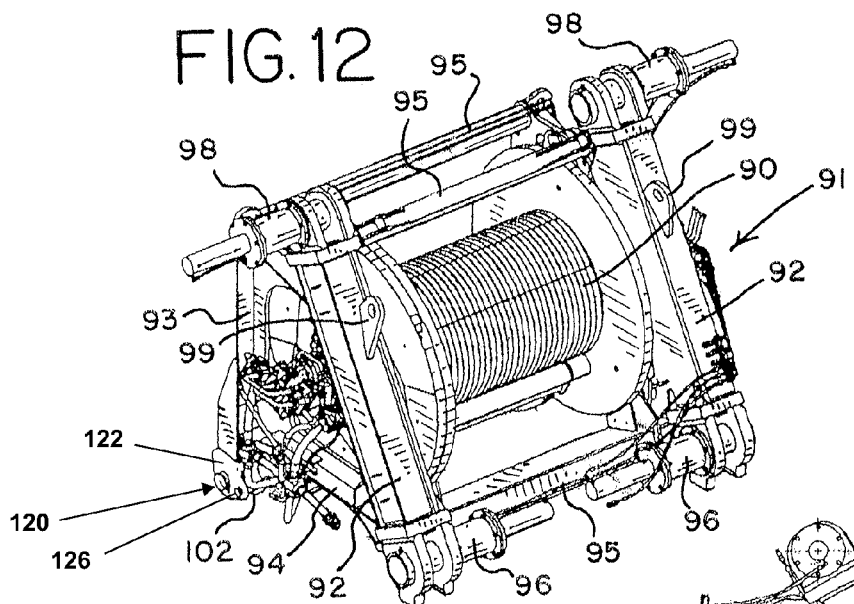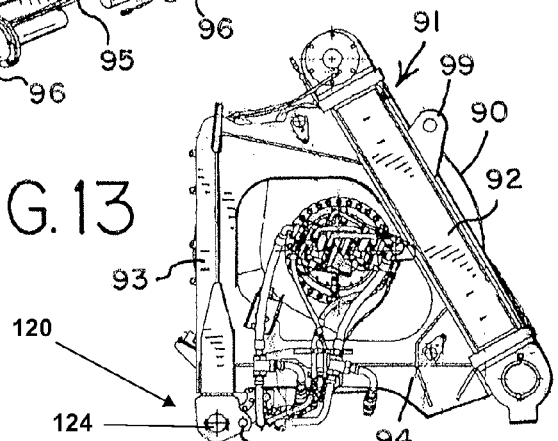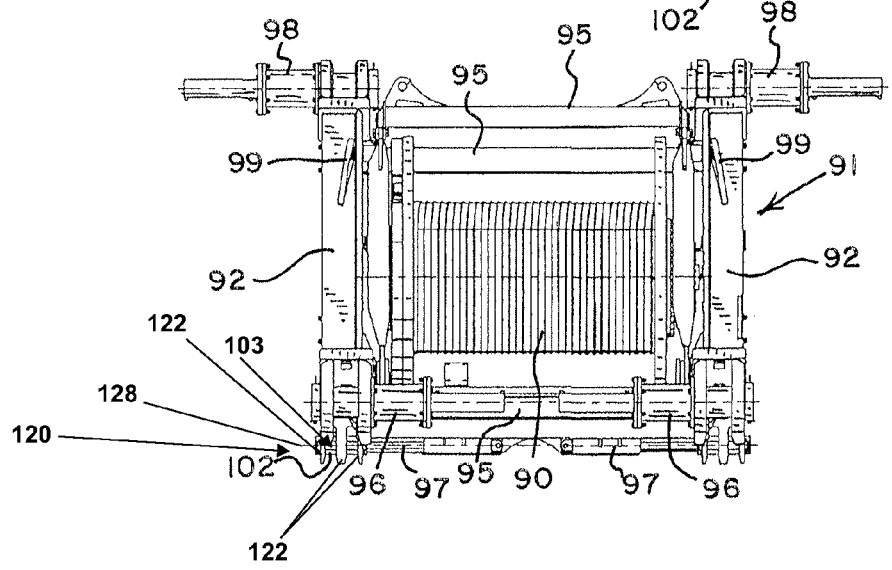

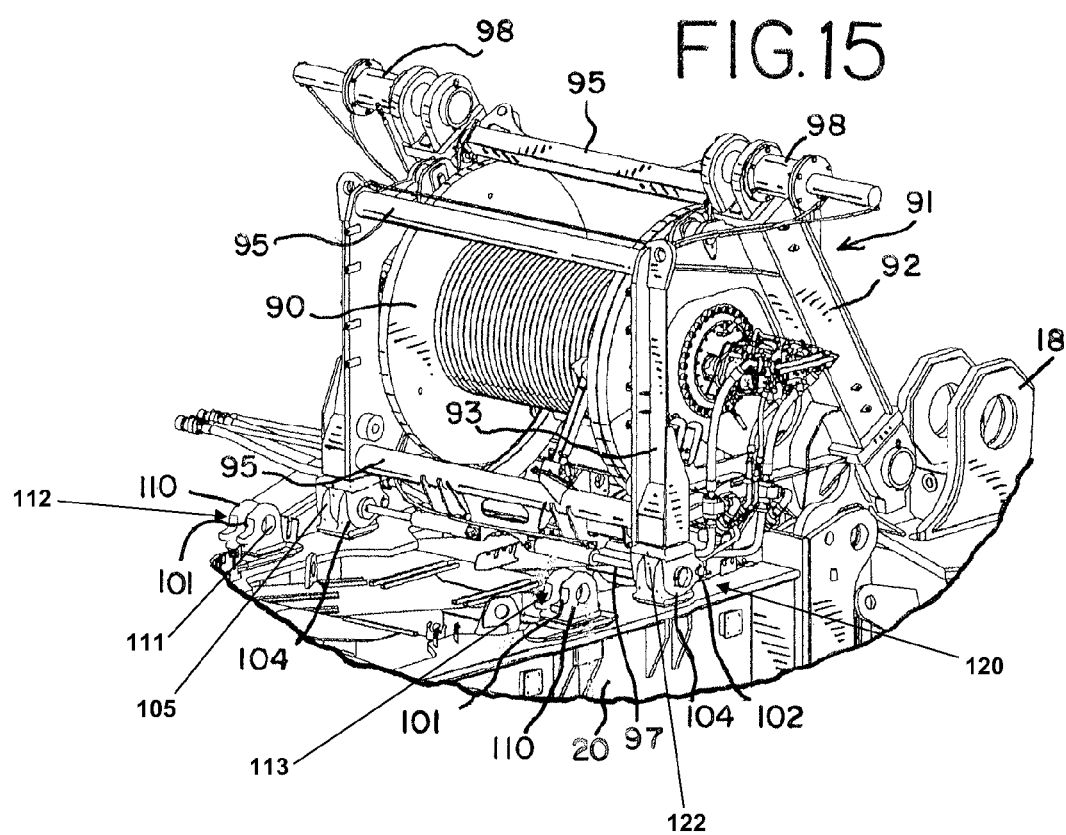

CONNECTION SYSTEM FOR CRANE COMPONENTS

REFERENCE TO EARLIER FILED APPLICATIONS

The present application is a continuation of U.S. patent application Ser. No. 12/561,094, filed Sep. 16, 2009, now U.S. Pat. No. 8,397,924, which issued Mar. 19, 2013, which in turn claims the benefit of the filing date under 35 U.S.C. §119(e) of Provisional U.S. Patent Application Ser. No. 61/098,632, filed Sep. 19, 2008, and of Provisional U.S. Patent Application Ser. No. 61/155,401, filed Feb. 25, 2009; both of which are hereby incorporated by reference in their entirety. The present application is also a continuation-in-part of U.S. patent application Ser. No. 13/154,236, filed Jun. 6, 2011, now U.S. Pat. No. 8,534,474, which issued Sep. 17, 2013, which in turn is a divisional of application Ser. No. 12/273,310, filed Nov. 18, 2008, now U.S. Pat. No. 7,954,657, which issued Jun. 7, 2011, which in turns claims the benefit of the filing date under 35 U.S.C. §119(e) of Provisional U.S. Patent Application Ser. No. 60/990,977, filed Nov. 29, 2007; all of which are hereby incorporated by reference in their entirety.

BACKGROUND

The present invention relates to a mobile lifting crane that uses multiple hoist drums. These hoist drums may include load hoist drums, such as for lifting a load and an auxiliary or whip line, and boom hoist drums, such as for changing the angle of the boom and changing the angle of a luffing jib.

Mobile lift cranes typically include a carbody having movable ground engaging members; a rotating bed rotatably connected to the carbody such that the rotating bed can swing with respect to the ground engaging members; a boom pivotally mounted on a front portion of the rotating bed, with a load hoist line extending there from, and counterweight to help balance the crane when the crane lifts a load. Many large capacity cranes include more than one load hoist drum, such as a second main hoist line and an auxiliary or whip line.

There are different ways of changing the angle of the boom with respect to the rotating bed during crane operation, including using hydraulic cylinders mounted between the boom and the rotating bed. However, more commonly a boom hoist drum and rigging are used to change the boom angle. Many cranes also use a mast mounted on the rotating bed to support the rigging, including the boom hoist rigging, so that it may transfer the forces from lifting a load to the rear of the carbody and the counterweight. The boom hoist rigging must carry large tension loads, supporting not only the boom, but counteracting the angled force applied by the boom as it supports the load. The boom hoist rigging includes the boom hoist line extending from the boom hoist drum and reeved through a lower equalizer (which may be attached to the top of the mast), and an upper equalizer with multiple parts of line so that the large tension loads on the rigging are distributed over the multiple parts of line. If the crane is equipped with a luffing jib, the crane will also normally include another boom hoist drum to spool the wire rope used to control the angle of the luffing jib. Thus a large capacity crane may be equipped with four or five hoist drums.

Since the crane will be used in various locations, it needs to be designed so that it can be transported from one job site to the next. This usually requires that the crane be dismantled into components that are of a size and weight that they can be transported by truck within highway transportation limits. For very large cranes, this may require taking the hoist drums off of the rotating bed. The ease with which the crane can be dismantled and set up has an impact on the total cost of using the crane. Thus, to the extent that fewer man-hours are needed to set up the crane, there is a direct advantage to the crane owner. Thus it is beneficial, if the hoist drums are removed, to be able to leave the line on the drums, and to the extent possible, leave the line reeved though as many sheaves as is possible.

Further, when there are a large number of hoist drums on the rotating bed, the rotating bed is typically rather long to provide space for mounting the drums, as well as the other major crane components that are mounted on the rotating bed, such as the mast, the boom stop and any mast stop or backhitch. However, a long rotating bed has disadvantages, primarily because it increases the tail swing of the crane when the crane is being repositioned on the job site. Also, a long rotating bed will inherently have increased weight and manufacturing costs, and may cause additional difficulties if the length exceeds highway transportation limits. Some crane manufacturers have resorted to mounting hoist drums on the boom or mast in order to avoid having a long rotating bed. However, this solution may not be entirely satisfactory, as the hydraulic lines supplying the hoist motors then have to run up the boom or mast, and the drums are harder to access for needed service.

Thus it would be a great advantage if a system could be developed that allowed for a multiple hoist drums to be included on the rotating bed without increasing the length of the rotating bed.

BRIEF SUMMARY

The present invention includes a crane that has a drum frame system that allows multiple drums to be mounted on the rotating bed, along with other crane components, in a compact fashion. The invention also involves a method of transporting and assembling a crane, utilizing the drum frame system.

In a first aspect, the invention is a mobile lift crane comprising a carbody having movable ground engaging members; a rotating bed rotatably connected to the carbody such that the rotating bed can swing with respect to the ground engaging members; a boom pivotally mounted on the rotating bed; a first hoist drum mounted in a first frame connected to the rotating bed; a second hoist drum mounted in a second frame connected to the rotating bed; and a third hoist drum mounted in a third frame indirectly connected to the rotating bed by being connected to at least one of the first and second hoist drum frames.

In a second aspect, the invention is a mobile lift crane comprising a carbody having movable ground engaging members; a rotating bed rotatably connected to the carbody such that the rotating bed can swing with respect to the ground engaging members; a boom pivotally mounted on the rotating bed; a first load hoist line trained over a pulley on the boom and wound on a first load hoist drum, the first load hoist drum being mounted in a frame connected to the rotating bed by removable pins, the first load hoist drum and frame thus being detachable from the rotating bed as a combined unit; a boom hoist drum mounted in a frame with a boom hoist line wound on the boom hoist drum, the boom hoist drum frame being connected to the rotating bed by removable pins, the boom hoist drum and frame thus being detachable from the rotating bed as a combined unit; and a first other major crane component connected indirectly to the rotating bed such that forces directed along a line of action of the first other major crane component are transferred to the rotating bed through at least one of the drum frames, wherein the first other major crane component is selected from the group consisting of a mast, a mast stop, a backhitch and a boom stop.

In a third aspect, the invention is a method of assembling a mobile lift crane, the lift crane comprising, during operation, i) a rotating bed, ii) a boom pivotally mounted on the rotating bed, iii) a boom hoist drum mounted in a frame secured to the rotating bed, iv) a first load hoist drum mounted in a frame secured to the rotating bed, and v) a second load hoist drum mounted in a frame secured to the rotating bed, the method comprising: a) pinning two of the drum frames to the rotating bed; and b) stacking and pinning the third hoist drum frame onto at least one of the two drum frames pinned to the rotating bed.

In a fourth aspect, the invention is method of transporting and assembling a mobile lift crane, the lift crane comprising, during operation, i) a rotating bed, ii) a boom pivotally mounted on the rotating bed, iii) a first hoist drum mounted in a frame secured to the rotating bed, iv) a second hoist drum mounted in a frame secured to the rotating bed, and v) at least a first other major crane component selected from the group consisting of a mast, a mast stop, a backhitch and a boom stop, the method comprising: a) transporting the first hoist drum mounted in its frame to a job site; b) transporting the second hoist drum mounted in its frame to the job site; c) transporting the rotating bed to the job site without either of the first hoist drum or second hoist drum being connected to the rotating bed; d) pinning the first hoist drum frame to the rotating bed at the job site; and e) pinning the first other major crane component indirectly to the rotating bed at the job site such that forces directed along a line of action of the major crane component are transferred through the frame of the first hoist drum to the rotating bed.

By utilizing the drum frame system of the present invention, the hoist drums can be stacked on top of each other on the rotating bed, thus allowing multiple drums to be mounted on the rotating bed without having to increase the length of the rotating bed. In a preferred embodiment, first and second main load hoist drums, an auxiliary load hoist drum and a boom hoist drum are all provided with frames that allow the drums to be stacked on top of one another on the rotating bed. Also, utilizing the drum frame system of the present invention, other major crane components that need to be mounted on the rotating bed can be placed at advantageous positions, which also minimizes the length of the rotating bed. These and other advantages of the invention, as well as the invention itself, will be more easily understood in view of the attached drawings.

BRIEF DESCRIPTION OF THE DRAWINGS

FIG. 3 is a perspective view of the boom hoist drum and frame used in the crane of FIG. 1, showing one of the hydraulic motors used to rotate the drum and some associated hydraulic lines.

FIG. 4 is a side elevational view of the boom hoist drum and frame of FIG. 3.

FIG. 5 is a rear elevational view of the boom hoist drum and frame of FIG. 3.

FIG. 6 is a perspective view of the first main load hoist drum and frame used in the crane of FIG. 1.

FIG. 7 is a side elevational view of the first main load hoist drum and frame of FIG. 6.

FIG. 8 is a front elevational view of the first main load hoist drum and frame of FIG. 6.

FIG. 12 is a perspective view of the auxiliary load hoist drum and frame used in the crane of FIG. 1, showing one of the hydraulic motors used to rotate the drum and some associated hydraulic lines.

FIG. 13 is a side elevational view of the auxiliary load hoist drum and frame of FIG. 12.

FIG. 14 is a front elevational view of the auxiliary load hoist drum and frame of FIG. 12.

FIG. 15 is an enlarged perspective view of the auxiliary load hoist drum and frame of FIG. 12 in its operational position on the rotating bed.

DETAILED DESCRIPTION OF THE DRAWINGS AND THE PRESENTLY PREFERRED EMBODIMENTS

Figure 1:
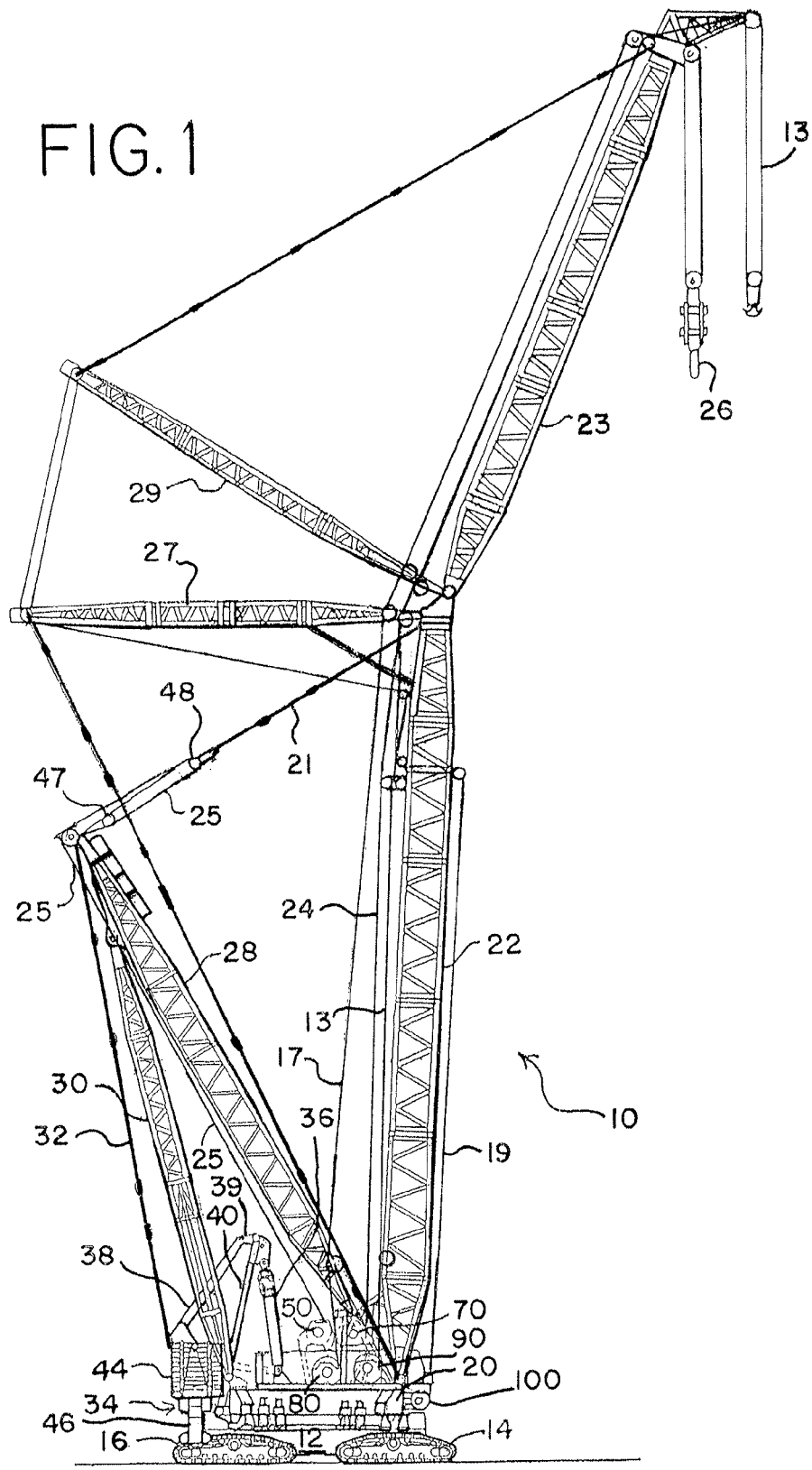
FIG. 1 is a side elevational view of a preferred embodiment of a mobile lift crane utilizing the drum frame system of the present invention.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The preferred embodiment of the present invention relates to a high capacity mobile lift crane, other aspects of which are disclosed in U.S. Pat. No. 7,546,928 and the following co-pending United States patent applications assigned to the assignee of the present application: "Mobile Lift Crane With Variable Position Counterweight," Ser. No. 12/023,902, filed Jan. 31, 2008; "Mast Raising Structure And Process For High-Capacity Mobile Lift Crane," Ser. No. 11/740,726, filed Apr. 26, 2007; "Boom Hoist Transportation System And Crane Using Same," Ser. No. 61/098,632 filed Sep. 19, 2008; "Trunnion Transportation System, Carbody Connection System And Crane Using Same," Ser. No. 61/099,098, filed Sep. 22, 2008; "Connection System For Crane Boom Segments," Ser. No. 12/273,310, filed Nov. 18, 2008; "Drive Tumbler And Track Drive For Mobile Vehicles, Including Lift Cranes," Ser. No. 12/368,143, filed Feb. 9, 2009; "Track Connection System For Mobile Vehicles, Including Lift Cranes," Ser. No. 12/368,125, filed Feb. 9, 2009; "Track Tensioning System For Mobile Vehicles, Including Lift Cranes," Ser. No. 12/368,113, filed Feb. 9, 2009; "Crane Hook Block," Ser. No. 61/155,455, filed Feb. 25, 2009; "Carbody Connection System and Crane Using Same," Ser. No. 61/155,440, filed Feb. 25, 2009; "Counterweight Block And Assemblies For Cranes," Ser. No. 61/158,599, filed Mar. 9, 2009; "Swing Drive System For Cranes," Ser. No. 61/155,414, filed Feb. 25, 2009; "Folding Jib Main Strut And Transportable Reeved Strut Caps," Ser. No. 61/165,403, filed Mar. 31, 2009; "Crane Boom Stop," Ser. No. 61/179,935, filed May 20, 2009; and "Crane Backstay Spreader", Ser. No. 61/179, 983, filed May 20, 2009. Each of these applications is hereby incorporated by reference.

Several terms used in the specification and claims have a meaning defined as follows.

In preferred embodiments of the invention, certain major crane components may be mounted on the rotating bed indirectly by being mounted to the drum frame system. Those components include the mast, a mast stop, a backhitch and a boom stop. The term "mast" designates a structure used on a rotating bed to hold the boom hoist rigging at a spaced distance from the boom hinge point so that the rigging can have a moment about the boom hinge point, thus allowing the boom angle to be changed. Both fixed masts and movable masts are common. Other terms are sometimes applied to these structures, such as the term "gantry". Often times the mast will include a sheave set at its top that is part of the equalizer system: an arrangement of sheaves secured together so as to act in concert in spreading tensional force between multiple parts of line. Equalizers are used in pairs. The term "upper equalizer" in a boom hoist rigging arrangement is used to refer to the equalizer closest to the boom top. The term "lower equalizer" is used to refer to the equalizer paired with the upper equalizer but furthest from the boom top. The "lower equalizer" is typically secured to a mast, and may be built into the mast top. This type of lower equalizer is often referred to as a mast top sheave assembly. Some cranes use a live mast, where a fixed length pendant is secured between the boom top and the live mast, and changes in the amount of boom hoist line directly change the angle of the live mast with respect to the rotating bed, which secondarily then changes the angle of the boom with respect to the rotating bed. In that instance the upper equalizer is secured to the top of the mast, and the lower equalizer is secured to the rotating bed at a lower point, such as on a gantry. See, for example, U.S. Patent Application Publication No. 2007/0256999. In that document, the embodiment of FIG. 2 has a guy line 44 between the boom top and the mast. In the context of the present definition, both the live mast 40 and the gantry 41 serve as masts.

The term "backhitch" designates a structure that supports the mast in a fixed position during crane operation. It can be a rigid structure that can handle both compression and tension loads, or it may be a pendant that handles tension loads only.

The term "mast stop" designates a structure used to support a mast at an elevated angle compared to the rotating bed. A mast stop is provided primarily so that when no load is on the boom, and the boom hoist rigging is thus not pulling the mast toward the boom, the weight of the mast can be supported.

The term "boom stop" designates a structure used to prevent a boom from tipping over backwards. The boom is designed to operate at angles less than 90° from horizontal. At steep boom angles there is a danger that the boom may go over 90° and start to fall backward, particularly if a load is suddenly released from a hoist line. The boom stop must be designed to handle large forces to either stop the boom from tipping over backward, or fail the boom in severe situations.

The term "hoist drum" designates a winch used to take up and pay out line that is used to lift a load or control a boom angle. For example, a boom hoist drum is used to control the angle of a boom. In this regard, a luffing jib attached to a main boom is also considered a boom, and the drum used to take up and pay out line to control the luffing jib angle is also considered to be a boom hoist drum. A load hoist drum designates a winch used to take up and pay out line that is used to lift a load. Sometimes two load hoist drums are used in concert to lift a load. Many times an auxiliary or whip line is also provided on a load hoist drum on the crane. The hoist drums typically include a cylindrical body on which the hoist line is wound, as well as the mechanical and hydraulic controls for controlling rotation of the cylindrical body. Again, by way of example, in U.S. Patent Application Publication No. 2007/0256999, the hoisting winch 7, with its drum 7a, constitutes an example of a boom hoist drum.

The term "hoist drum frame" designates the structure that is used to hold the hoist drum components together, and to mount them to other crane components. Also, as in the present invention, other components may be mounted to the frame. However, the term "frame" is meant to designate structure that is reasonably close in size to the drum and used for the above enumerated purposes. Thus structure that is used as another major component of a crane, or that is more than twice as long as the cylindrical part of the drum, or more than twice the diameter of the drum, would not be considered part of a frame of the drum. Again, by way of example, in U.S. Patent Application Publication No. 2007/0256999, the brackets holding the shaft 7b constitute part of the frame. However, when the winch 7 is connected to the compressing member 42 as in FIG. 2, or attached to the frames that constitute mast 8 in FIGS. 1A and 1C, the compressing member 42 and the mast 8 are not part of the boom hoist drum frame.

The termed "pinned" (and variations thereof, such as "pinning") is meant to designate a connection between components that allows for the transfer of forces between the components, and also allows the connection to be easily disassembled. Most typically a pinned connection is one that transfers force though shear forces on a pin passing through holes in the two connected structures. In addition to pins, bolts can be used to make a "pinned" connection as that term is used herein.

While the invention will have applicability to many types of cranes, it will be described in connection with mobile lift crane 10, shown in an operational configuration in FIG. 1. The mobile lift crane 10 includes lower works, also referred to as a carbody 12, and movable ground engaging members in the form of crawlers 14 and 16. There are of course two front crawlers 14 and two rear crawlers 16, only one each of which can be seen from the side view of FIG. 1. In the crane 10, the ground engaging members could be just one set of crawlers, one crawler on each side. Of course additional crawlers than those shown can be used, as well as other types of ground engaging members, such as tires.

A rotating bed 20 is rotatably connected to the carbody 12 such that the rotating bed can swing with respect to the ground engaging members. The rotating bed is mounted to the carbody 12 with a slewing ring, such that the rotating bed 20 can swing about an axis with respect to the ground engaging members 14, 16. The rotating bed supports a boom 22 pivotally mounted on a front portion of the rotating bed; a mast 28 mounted at its first end on the rotating bed, with a lower equalizer 47 connected to the mast adjacent the second end of the mast; a backhitch 30 connected between the mast and a rear portion of the rotating bed; and a movable counterweight unit 34. The counterweight may be in the form of multiple stacks of individual counterweight members 44 on a support member.

Boom hoist rigging (described in more detail below) between the top of mast 28 and boom 22 is used to control the boom angle and transfer load so that the counterweight can be used to balance a load lifted by the crane. A load hoist line 24 is trained over a pulley on the boom 22, supporting a hook 26. At the other end, the load hoist line is wound on a first main load hoist drum 70 connected to the rotating bed, described in more detail below. The rotating bed 20 includes other elements commonly found on a mobile lift crane, such as an operator's cab, hoist drum 50 for the boom hoist rigging, a second main hoist drum 80 and an auxiliary load hoist drum 90 for a whip line, also described in more detail below. If desired, and as shown in FIG. 1, the boom 22 may comprise a luffing jib 23 pivotally mounted to the top of the main boom, or other boom configurations. When a luffing jib 23 is included, the crane may include first and second jib struts 27 and 29, as well as associated luffing jib rigging and a luffing jib hoist drum 100, which in the embodiment depicted is mounted on the front roller carrier of the rotating bed 20. Luffing jib hoist line 19 runs from drum 100 up to the rigging that controls the angle between jib struts 27 and 29.

The backhitch 30 is connected adjacent the top of the mast 28, but down the mast far enough that it does not interfere with other items connected to the mast. The backhitch 30 may comprise a lattice member, as shown in FIG. 1, designed to carry both compression and tension loads. In the crane 10, the mast is held at a fixed angle with respect to the rotating bed during crane operations, such as a pick, move and set operation.

The counterweight unit 34 is movable with respect to the rest of the rotating bed 20. A tension member 32 connected adjacent the top of the mast supports the counterweight unit in a suspended mode. A counterweight movement structure is connected between the rotating bed and the counterweight unit such that the counterweight unit may be moved to and held at a first position in front of the top of the mast, and moved to and held at a second position rearward of the top of the mast, described more fully in U.S. patent application Ser. No. 12/023,902.

At least one linear actuation device 36, such as a hydraulic cylinder, or alternatively a rack and pinion assembly, and at least one arm pivotally connected at a first end to the rotating bed and at a second end to the a linear actuation device 36, are used in the counterweight movement structure of crane 10 to change the position of the counterweight. The arm and linear actuation device 36 are connected between the rotating bed and the counterweight unit such that extension and retraction of the linear actuation device 36 changes the position of the counterweight unit compared to the rotating bed. While FIG. 1 shows the counterweight unit in its most forward position, the linear actuation device 36 can be partially or fully extended, which moves the counterweight unit to mid and aft positions, or any intermediate position, such as when a load is suspended from the hook 26.

In the preferred embodiment of the counterweight movement structure, a pivot frame 40, which may be a solid welded plate structure, is connected between the rotating bed 20 and the second end of the linear actuation device 36. The rear arm 38 is connected between the pivot frame 40 and the counterweight unit. The rear arm 38 is also a welded plate structure with an angled portion 39 at the end that connects to the pivot frame 40. This allows the arm 38 to connect directly in line with the pivot frame 40. The backhitch 30 has an A-shape configuration, with spread apart lower legs, which allows the counterweight movement structure to pass between the legs when needed.

The crane 10 may be equipped with a counterweight support system 46, which may be required to comply with crane regulations in some countries. The counterweight movement structure and counterweight support structure are more fully disclosed in U.S. patent application Ser. No. 12/023,902.

The boom hoist rigging includes a boom hoist line in the form of wire rope 25 wound on a boom hoist drum 50, and reeved through sheaves on a lower equalizer 47 and an upper equalizer 48. The boom hoist drum is mounted in a frame 60 (FIG. 2) connected to the rotating bed. The rigging also includes fixed length pendants 21 connected between the boom top and the upper equalizer 48. The lower equalizer 47 is connected to the rotating bed 20 though the mast 28. This arrangement allows rotation of the boom hoist drum 50 to change the amount of boom hoist line 25 between the lower equalizer 47 and the upper equalizer 48, thereby changing the angle between the rotating bed 20 and the boom 22.

The boom hoist drum frame 60, the lower equalizer 47 and the upper equalizer 48 each include cooperating attachment structures whereby the lower and upper equalizers can be detachably connected to the boom hoist drum frame so that the boom hoist drum, the lower equalizer, the upper equalizer and the boom hoist line can be transported as a combined assembly. The combined boom hoist drum 50, frame 60, lower equalizer 47 and upper equalizer 48, arranged as they would be for transportation between job sites, are described in U.S. patent application Ser. No. 61/098,632.

As noted above, in the preferred embodiment of the invention, the crane includes four drums each mounted in a frame and connected to the rotating bed in a stacked configuration. (The rotating bed includes a main frame and front and rear roller carriers.) A fifth drum is mounted in a frame attached to the front surface of the front roller carrier. Frames of two of the four stacked drums are connected directly to the rotating bed, while the frames of the other two drums are indirectly connected to the rotating bed by being directly connected to at least one of the two drum frames connected directly to the rotating bed. In this case, the four stacked drums are preferably the first main load hoist drum 70 with load hoist line 24 wound thereon, the second main load hoist drum 80 with load hoist line 17 wound thereon, the auxiliary load hoist drum 90 with whip line 13 wound thereon, and the boom hoist drum 50 with boom hoist line 25 wound thereon. Preferably the frame 91 of the auxiliary load hoist drum 90 and frame 81 of the second main load hoist drum 80 are connected directly to the rotating bed (the frame 91 pins at its front onto the front roller carrier), the frame 71 of the first main load hoist drum 70 is connected to both of frames 81 and 91, while the frame 60 for the boom hoist drum 50 is connected to frame 81. In that regard, the boom hoist drum frame 60 is thus stacked on top of and pinned directly to the second main load hoist drum frame 81, and the first main load hoist drum frame 71 is stacked on top of and pinned directly to the auxiliary load hoist drum frame 91.

Figure 2:
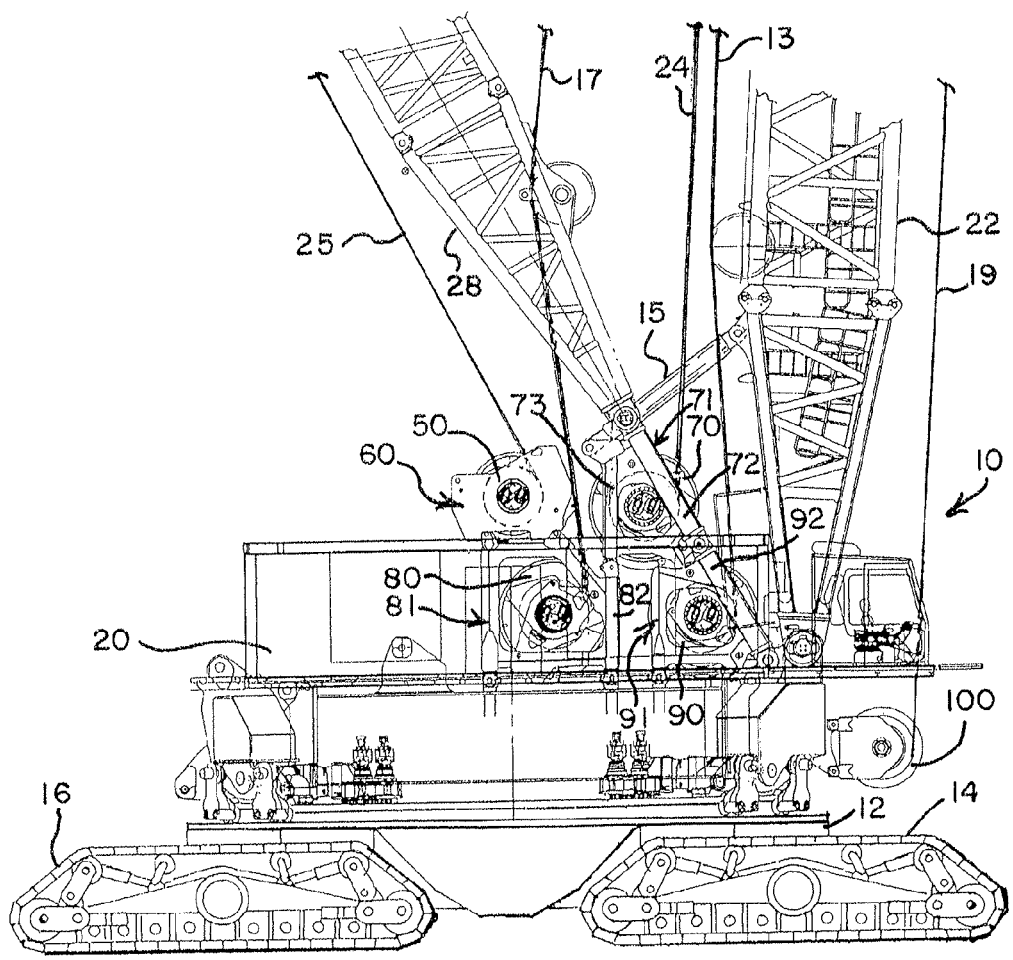
FIG. 2 is an enlarged side elevational view of the crane of FIG. 1 with some of the components removed for sake of clarity.

As best seen in FIG. 2, the drum frames are sized and spaced such that drum 70 is mounted so that the elevation of the lowest portion of the drum 70 is at or above the top most portions of the drums 80 and 90. Drum 50 is likewise held at an elevation above the top most portions of the drums 80 and 90. The drum frames are connected to the rotating bed and to each other by removable pins, allowing the frames to be disconnected from and transported separately from the rotating bed.

The boom hoist drum 50 and frame 60 are best seen in FIGS. 3-5. The wire rope 25 normally found wrapped on the drum 50 is not shown in FIGS. 3-5 for sake of clarity. The boom hoist line 25 is preferably continuously reeved, with both ends of the line being tied off on the boom hoist drum 50. As with conventional boom hoist drums using continuous reeving, the drum 50 (FIG. 3) includes a main cylinder 52 on which the rope 25 is wrapped, with ends 53 and 54, and a separator 55 in the center that separates the two ends of the line as they are wound on the drum. A ratchet and pawl 56 are included to lock the drum when needed. A drive assembly on each end of the drum includes dual variable displacement hydraulic motors 58, each with a spring-set, hydraulic-release brake and appropriate gearing (not shown as they are located inside the drum, as is conventional). (Also, a pair of rear rigging winches 59 are mounted on frame 60. These winches 59 are used to pull the legs of backhitch 30 into position to be pinned during crane assembly.)

The boom hoist drum frame 60 includes end plates 61, and a number of mounting plates 62 of various shapes spaced inwardly from the end plates 61. The frame is tied together with cross bars 63, 64, 65 and 66. The shapes and placement of the mounting plates 62 are dependent on the drive mechanism, brake and other components that are attached to them. These, and other features of the drum, will vary depending on the components used to make up the boom hoist drum, and are not crucial to the invention. However, to mount the equalizers on the frame 60 during transport, the frame is provided with some additional mounting brackets. The top rear cross bar 64 includes two sets of brackets 67 used to mount the lower equalizer 47. The top front cross bar 65 includes two links 68 that extend upwardly along the length of the bar 65, terminating in brackets 69 to which the upper equalizer 48 may be connected.

The first main load hoist drum 70 and its frame 71 are best seen in FIGS. 6-8. The wire rope normally found wrapped on drum 70, and the drive motors, brakes and gear boxes associated therewith, are conventional and are not shown for sake of clarity. The frame 71 has two ends and is generally triangular in shape when viewed from the side. Each end has a main diagonal front leg 72, a vertical rear leg 73 and a bottom cross member 74. The frame ends are tied together with cross bars 75. The legs 72 and 73 have holes at their lower ends for pinning the frame 71 to the frames 81 and 91. The legs also have holes at their upper ends to which other major crane components are pinned, as described in more detail below. The holes at the top of legs 72 have hydraulically operated pin pullers 78 (FIGS. 6 and 8) associated with them. Lifting lugs 79 are mounted on the front legs 72 to allow the drum 70 and frame 71 to be lifted as a combined unit.

Figure 9:
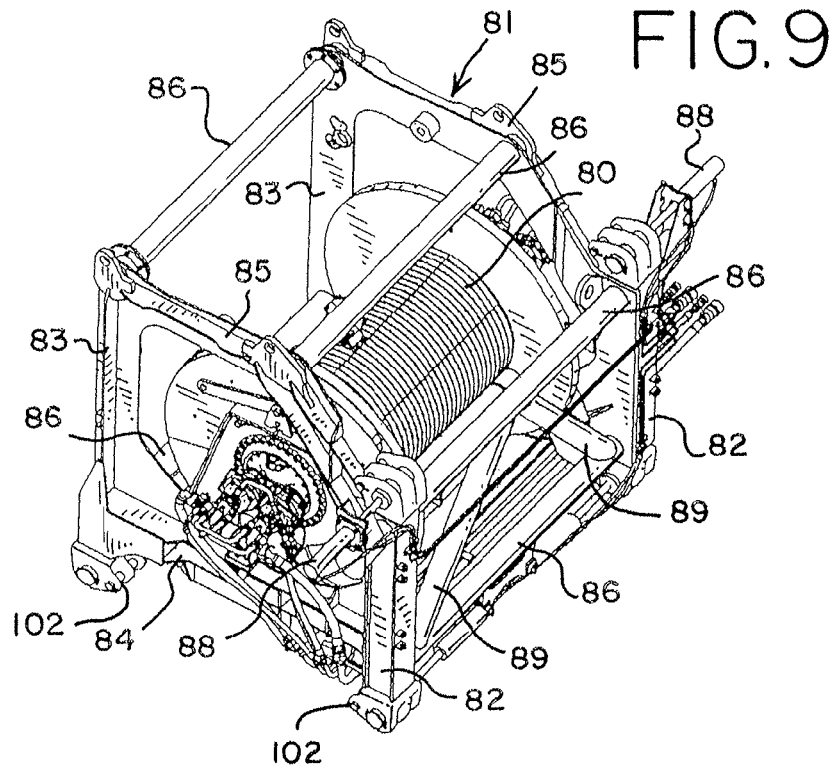
FIG. 9 is a perspective view of the second main load hoist drum and frame used in the crane of FIG. 1, showing one of the hydraulic motors used to rotate the drum and some associated hydraulic lines.
Figure 10:
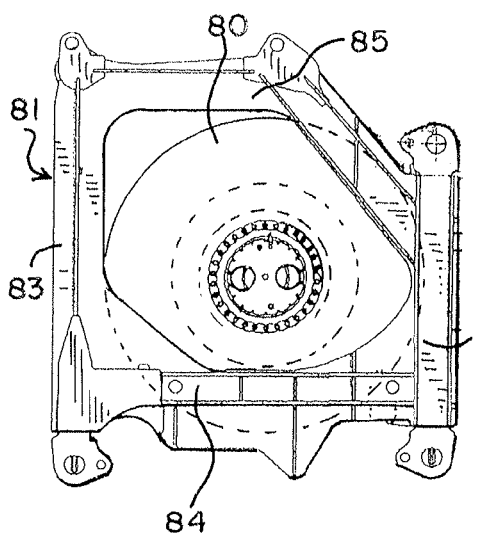
FIG. 10 is a side elevational view of the second main load hoist drum and frame of FIG. 9.
Figure 11:
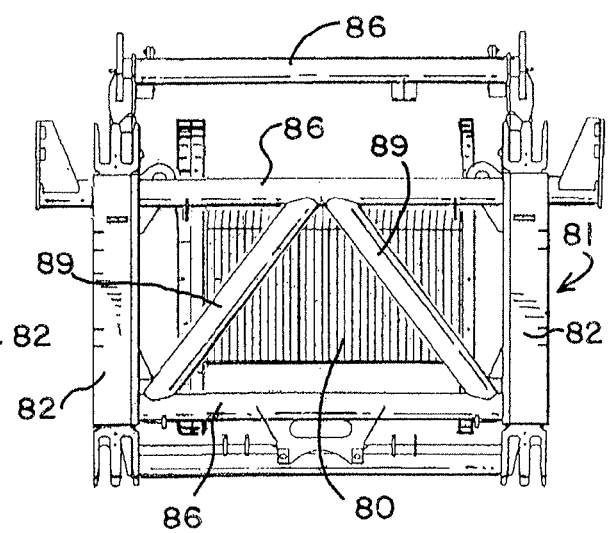
FIG. 11 is a front elevational view of the second main load hoist drum and frame of FIG. 9.

The second main load hoist drum 80 and its frame 81 are best seen in FIGS. 9-11. The wire rope normally found wrapped on drum 80, and the drive motors, brakes and gear boxes associated therewith, are conventional and (except for the drive motor shown in FIG. 9) are not shown for sake of clarity. The frame 81 has two ends and is generally square in shape when viewed from the side. Each end has a vertical front leg 82, a vertical rear leg 83, a bottom cross member 84 and a top member 85 that is angled to provide a bevel form to the front top corner of the otherwise boxed shape frame. The frame ends are tied together with cross bars 86 and two diagonal braces 89 between the cross bars 86 on the front of the frame. The legs 82 and 83 have holes at their lower ends for pinning the frame 81 to the rotating bed 20. The legs 82 have holes at their upper ends to which the frame 71 is pinned during crane assembly. These holes have hydraulically operated pin pullers 88 (FIG. 9) associated with them. The legs 83 and top members 85 contain holes to which the frame 60 is pinned during crane assembly.

The auxiliary load hoist drum 90 and its frame 91 are best seen in FIGS. 12-14. The wire rope normally found wrapped on drum 90, and the drive motors, brakes and gear boxes associated therewith, are conventional and (except for the drive motors shown in FIGS. 12 and 13) are not shown for sake of clarity. The frame 91 has two ends and is generally triangular in shape when viewed from the side. Each end has a main diagonal front leg 92, a vertical rear leg 93 and a bottom cross member 94. The frame ends are tied together with cross bars 95. The legs 92 and 93 have holes at their lower ends for pinning the frame 91 to the rotating bed. These holes have hydraulic pin pullers 96 and 97 associated with them. The legs 92 also have holes at their upper ends to which frame 71 is pinned during crane assembly. These holes have hydraulic pin pullers 98 associated with them. Lifting lugs 99 are mounted on the front legs 92 to allow the drum 90 and frame 91 to be lifted as a combined unit.

FIG. 15 shows how the frame 91 is pinned to the rotating bed 20 during crane assembly. FIG. 15 also shows the lugs 18 into which the boom foot is pinned to the front roller carrier portion of the rotating bed, and the lugs 110 into which the second load hoist drum frame 81 is pinned to the rotating bed 20. Lugs 110 include a notch 101 that is used for centering the frame 81 as it is lowered into place. A locating pin 102 (FIG. 9) is captured in the end of legs 82 next to the pinning hole. As the leg 82 comes into contact with the lug 110, the locating pin 102 settles into notch 101 and centers the hole in the end of leg 82 with the hole in the lug 110. Similar locating pins 102 are used to mount frame 91 to the rotating bed. As seen in FIGS. 12-14, frame 91 has locating pins 102 at the bottom of rear legs 93 that fit in notches on lugs 104 on the rotating bed (FIG. 15). The frames also include brackets for mounting other devices to the frames, such as pressure roller assemblies and bail limit assemblies (not shown). The pressure roller helps keep the line tight on the drum when rope may be slack, and the bail limit is used to sense the presence of rope on the drum, so that rotation of the drum may be stopped before the last turns of rope are spooled off the drum.

In other words, FIGS. 12, 13, and 15 illustrate just one example of a mated connection between two crane components. At least one pair of first connectors 120 affixed to a first crane component, such as the auxiliary load hoist frame 91. The first connector 120 includes at least one extension 122 (FIG. 15) with a through-hole there through 124 and an engagement member, such as the locating pin, 102. At least one pair of second connectors, such as lugs 104, are affixed to a second crane component, such as the rotating bed 20. 8. In some embodiments, the first crane component includes two pairs of first connectors 120, and the second crane component includes two pairs of second connectors 104. One each of the first connectors 120 is mated with one of the second connectors 104. Each second connector includes at least one extension 105 having a through-hole there through (illustrated as hole 111 in lug 110) and an alignment surface, such as notch 101 on lug 110. The number of extensions 122, 105 on the first connector 120 and the second connector 104, respectively, are such that there is at least one extension from one of the connectors interleaved between two extensions of the other connectors. For example, if the first connector 120 comprises three extensions 122, the second connector 104 comprises two extensions 105.

A main pin, such as the hydraulic pin puller 97, is configured to pass through each combination of the first and second mated connectors 120 and 104 and to secure the first and second connectors 120 and 104 together.

The shape and the position of the alignment surfaces and engagement members, such as the notches 101 and the locating pins 102, for example, are such that as the two crane components are brought close to their operational position, the alignment surface and the engagement member of each combination of first and second connectors 120 and 104 come into contact with one another to guide the crane components into their operational orientation. In some embodiments, the alignment surface faces away from the crane component to which it is attached.

As noted, an example of the engagement member is the locating pin, or a guide pin, 102. As illustrated in FIG. 14, the engagement member extends outwardly from at least one side of an extension 122 on the first connector 120. In those embodiments in which the engagement member is a locating pin or a guide pin 122, the guide pin 122 may be captured in an additional through-hole 126 though an extension 122 on the first connector 120. The guide pin 102 extends from the extension 122 generally parallel to an axis 128 of the through-hole 126 in the extension 122 to which the guide pin 102 is attached.

Referring to FIG. 15, the alignment surface, such as notch 101 on each second connector, or lug 110, for example, comprises a pin seat 112 matching an outer portion 103 (FIG. 14) of the guide pin 102. The geometry of the first and second connectors 120 and 104 is such that if the two crane components 91 and 20 are not exactly aligned as they come together, the outside 113 (illustrated on lug 110) of the extensions 105 on the second connectors, or lugs 104, will engage the engagement members, or locating pins 102, on the extensions 122 of the first connectors 120 and force the first connectors 120 laterally, thus guiding the components 91 and 20 into the proper alignment, with further movement of the two crane components towards each other bringing the engagement member 102 and the alignment surface 101 on both the pairs of connectors 120 and 104 to a fully engaged position wherein the through-holes 124, 111 through the extensions 122, 105 in the connectors 120, 104, respectively, are aligned such that the main pins, such as main pin puller 97, can be inserted through the through-holes 124, 111 of all extensions 122, 105 in the first and second mating connectors 120, 104. The compressive loads on the first crane component generate shear forces in the main pin 97 holding the first and second connectors 120, 104 together, and the compressive loads are carried by four shear surfaces in the main pin 97.

Another aspect of the invention can be seen from FIG. 2. In addition to the load hoist and boom hoist drums being mounted in frames connected to the rotating bed by removable pins so that they can each be detached from the rotating bed as a combined drum and frame unit, the stack of drum frames allows for placement of at least one other major crane component connected indirectly to the rotating bed such that forces directed along a line of action of the other major crane component are transferred to the rotating bed through at least one of the drum frames. The other major crane components for which this invention is most useful include the mast, a mast stop, a backhitch and a boom stop. In the preferred embodiment, both the mast 28 and the boom stop 15 are attached indirectly to the rotating bed 20. In the embodiment shown, the mast 28 is supported by backhitch 30, so a mast stop is not needed. In this embodiment the backhitch is connected directly to the rotating bed rather than indirectly though the drum frame system, but in other crane designs it may be desirable to have a backhitch connected to the rotating bed indirectly through the drum frame system.

The mast 28 carries compressive loads. Thus the line of action of the forces in the mast is directed down the axis of the mast. The connection point of the mast to the drum frame system directs those forces though the drum frame system to the rotating bed 20. In the embodiment shown in FIG. 2 it is easy to see how the compressive load of the mast is carried through the front diagonal legs 72 and 92 of drum frames 71 and 91. The legs 72 and 92 are in a direct line with the axis of the mast.

The boom stop 15 has a line of action through the longitudinal axis of the boom stop. The forces in the boom stop are thus transferred from the boom stop into pins at the top of leg 73 that are in line with the longitudinal axis of the boom stop. The forces at the pins are then transferred to the rotating bed through the geometry of the members of drum frames 71, 81 and 91. If the boom 22 were to recoil backward beyond its maximum designed nearly-vertical position, compressive loads would be transmitted through the boom stop 15 to the pins at the top of leg 73 into the structure of frame 71. That load would be resolved by a compressive force down the legs 73 of frame 71 and legs 82 of frame 81, and a tension load through the legs 72 of frame 71 and legs 92 of frame 91. Thus with the boom stop 15, the forces directed along a line of action of the boom stop are transferred to the rotating bed 20 through three of the drum frames.

The preferred method of assembling the mobile lift crane 10 at a job site utilizes the present invention. In that method, two of the drum frames are pinned to the rotating bed; and a third hoist drum frame is stacked and pinned onto at least one of two drum frames pinned to the rotating bed. In this embodiment, the auxiliary load hoist drum frame 91 and the second main load hoist drum frame 81 are pinned to the rotating bed, and the boom hoist drum frame 60 is pinned to the second main load hoist drum frame 81, and the first main load hoist drum frame 71 is pinned to both the frames 81 and 91.

In another aspect, the invention involves a method of transporting and assembling a mobile lift crane. In this aspect, a first hoist drum mounted in its frame is transported to a job site. A second hoist drum mounted in its frame is also transported to the job site. The rotating bed is transported to the job site without either of the first hoist drum or second hoist drum being connected to the rotating bed. At the job site, the first hoist drum frame is pinned to the rotating bed; and then the other major crane component is pinned indirectly to the rotating bed at the job site such that forces directed along a line of action of the major crane component are transferred through the frame of the first hoist drum to the rotating bed. In the preferred embodiment, each of the drums 50, 70, 80 and 90 are transported in the job site in their respective frames but not attached to the rotating bed 20. The mast 28 and boom stop 15 are both pinned indirectly to the rotating bed at the job site such that forces directed along a line of action of each of the mast and boom stop are transferred through the frame 71 of the first main load hoist drum to the rotating bed 20 through frames 81 and 91. Thus the preferred method comprises pinning a third and fourth hoist drum frame (81 and 91) directly to the rotating bed, and the first main load hoist drum frame 71 is pinned to the rotating bed by being stacked on top of and pinned to the third host drum frame, and the mast and boom stop are both pinned to the first main load hoist drum frame 71. Meanwhile, the boom hoist drum frame 60 is stacked on the second main load hoist drum frame 81, with the frame 60 being pinned to the frame 81.

With the drums stacked in the preferred arrangement and the mast connected at the top of the stack of drum frames as shown in FIG. 2, the wire rope routing is simplified, with few rope guides needed. While the second main hoist line 17 has to run up through the mast 28, the first main hoist line 24 and whip line 13, as well as the boom hoist line 25, do not have to pass though the mast.

One of the advantages of having the mast and boom stop connected indirectly to the rotating bed 20 through the drum frame system is that the rotating bed can be compact, as separate space on the rotating bed does not need to be provided for pinning these other major crane components directly to the rotating bed. In addition, with the mast connection point being elevated to the top of the drum frame stack, the crane can be assembled with the mast being laid out over the rear of the rotating bed, as explained more fully in U.S. Patent Application Ser. No. 61/098,632.

It should be understood that various changes and modifications to the presently preferred embodiments described herein will be apparent to those skilled in the art. For example, the number of hoist drums on the crane may be more or less than shown. Also, the arrangement of which type of drum (load hoist or boom hoist) is on the top of the stack or on the bottom of the stack can be modified. The frame 91 may be installed without drum 90 being in it when the crane does not need an auxiliary load hoist drum. Also, while the frames 81 and 91 are pinned directly to the weldment of the rotating bed, it is possible in some designs that the lower drum frames would be pinned to an intermediate piece that is connected to the rotating bed. Such changes and modifications can be made without departing from the spirit and scope of the present invention and without diminishing its intended advantages. It is therefore intended that such changes and modifications be covered by the appended claims.

The invention claimed is:

1. A mated connection between two crane components comprising:
   a) at least one pair of first connectors affixed to a first crane component, each first connector comprising at least one extension having a through-hole there through and an engagement member;
   b) at least one pair of second connectors affixed to a second crane component, with one each of the first connectors mated with one of the second connectors, each second connector comprising at least one extension having a through-hole there through and an alignment surface thereon;
   c) the number of extensions on the first and second connectors being such that there is at least one extension from one of the connectors interleaved between two extensions of the other connector; and
   d) a main pin for each combination of first and second mated connectors, the main pin passing through the through-holes of the interleaved extensions and securing the first and second connectors together;
   e) wherein the shape and the position of the alignment surfaces and engagement members are such that as the two crane components are brought close to their operational position, the alignment surface and the engagement member of each combination of first and second connectors come into contact with one another to guide the crane components into their operational orientation.

2. The mated connection of claim 1 wherein the engagement member extends outwardly from at least one side of the at least one extension on the first connector.

3. The mated connection of claim 2 wherein the engagement member comprises a guide pin captured in an additional through-hole though the at least one extension on the first connector.

4. The mated connection of claim 3 wherein the guide pin extends from the extension generally parallel to the axis of the through-hole in the extension to which the guide pin is attached.

5. The mated connection of claim 3 wherein the alignment surface on each second connector comprises a pin seat matching an outer portion of the guide pin.

6. The mated connection of claim 1 wherein the geometry of the first and second connectors is such that if the two crane components are not exactly aligned as they come together, an outside of the extensions on the second connectors will engage the engagement members on the extensions of the first connectors and force the connectors laterally, thus guiding the components into the proper alignment, with further movement of the two crane components towards each other bringing the engagement member and the alignment surface on both the pairs of connectors to a fully engaged position wherein the through-holes through the extensions in the connectors are aligned such that the main pins can be inserted through the through-holes of all extensions in the first and second mating connectors.

7. The mated connection of claim 1 wherein the first and second components comprise a drum frame and a rotating bed for a lift crane.

8. The mated connection of claim 1 wherein the first crane component includes two pairs of first connectors, and the second crane component includes two pairs of second connectors.

9. The mated connection of claim 1 wherein the first connector comprises three extensions and the second connector comprises two extensions.

10. The mated connection of claim 1 wherein compressive loads on the first crane component generate shear forces in the main pin holding the first and second connectors together, and the compressive loads are carried by four shear surfaces in the main pin.

11. A crane with a first crane component connected to a second crane component comprising:
    a) a first connector affixed to the first crane component, the first connector comprising a plurality of extensions each having a through-hole there through, and a guide pin captured in an additional through-hole though the extensions;
    b) a second connector affixed to the second crane component, the second connector also having a plurality of extensions each having a through-hole there through, the extensions of the first connector being interleaved with the extensions of the second connector, the second connector further having an alignment surface formed on an outer surface of the extensions which engages the guide pin, and wherein the alignment surface faces away from the crane component to which it is attached; and
    c) the first and second crane components further comprising a third connector comprising a plurality of extensions each having a through-hole there through, and a guide pin captured in an additional through-hole though the extensions, and a fourth connector also having a plurality of extensions each having a through-hole there through, the fourth connector further having an alignment surface formed on an outer surface of the extensions and wherein the alignment surface on the fourth connector faces away from the crane component to which it is attached;
    d) wherein the shape and the position of the guide pins and alignment surfaces are such that as the two crane components are brought close to their operational position during an assembly operation, the guide pins and the alignment surface of each combination of first and second connectors come into contact with one another to guide the crane components into their operational orientation so that a first main pin can be placed through the through-holes of the extensions of the first and second connectors and a second main pin can be placed through the through-holes of the extensions of the third and fourth connectors.

12. The crane of claim 11 wherein the first connector comprises three extensions and the second connector comprises two extensions.

13. The crane of claim 11 wherein the first and second components comprise a drum frame and a rotating bed for a lift crane.

14. The crane of claim 11 wherein the first and third connectors are both affixed to the first crane component and the second and fourth connectors are both affixed to the second crane component.

15. A method of connecting first and second crane components, the first crane component comprising at least one pair of first connectors each comprising at least one extension having a through-hole there through and an engagement member, and the second crane component comprising at least one pair of second connectors each comprising at least one extension having a through-hole there through and an alignment surface thereon, the method comprising:
   a) bringing the two crane components together such that that there is at least one extension from one of the connectors in each pair of connectors interleaved between two extensions of a connector in the other pair of connectors, forming two pairs of matched first and second connectors;
   b) bringing the engagement member of each first connector into contact with the alignment surface of each second connector of the matched connectors;
   c) continuing to move the two crane components towards each other, with the shape and the position of the alignment surfaces and engagement members on the extensions being such that as the two crane components move closer toward each other, the alignment surfaces and engagement members guide the crane components into their operational orientation; and
   d) fastening each of the matched connectors together with a main pin passing through the through-holes of the interleaved extensions and securing the first and second connectors together.

16. The method of claim 15 wherein the engagement member extends outwardly from at least one side of the at least one extension on the first connector.

17. The method of claim 15 wherein the first and second components comprise a drum frame and a rotating bed for a lift crane.

18. A method of connecting first and second crane components, the first crane component comprising at least one pair of first connectors affixed to the first crane component, each first connector comprising at least one extension having a through-hole there through and an engagement member; the second crane component comprising at least one pair of second connectors affixed to the second crane component, each second connector comprising at least one extension having a through-hole there through and an alignment surface thereon, the method comprising:
   a) lowering the first crane component onto the second crane component such that one each of the pair of first connectors mates with one each of the pair of second connectors to form a pair of mated connectors, the number of extensions on the first and second connectors being such that there is at least one extension from one of the connectors interleaved between two extensions of the other connector;
   b) as the first crane component is lowered, the shape and the position of the alignment surfaces and engagement members on the extensions come into contact with one another to guide the crane components into their operational orientation; and
   c) placing a main pin through the through-holes of the extensions of each of the mated first and second connectors.

19. The method of claim 18 wherein the first alignment surface is provided by a guide pin.

20. The method of claim 18 wherein the connectors on the first crane component have two extensions and the connectors on the second crane component have three extensions.

* * * * *